Dec. 22, 1964  R. E. DENNIS  3,162,198
BINDER UNIT

Filed Aug. 17, 1961  3 Sheets-Sheet 1

*INVENTOR.*
RALPH E. DENNIS

BY
MAHONEY, MILLER & RAMBO
BY *Wm. V. Miller*
ATTORNEYS

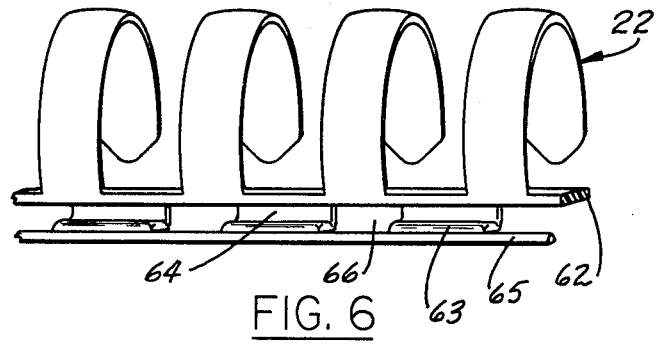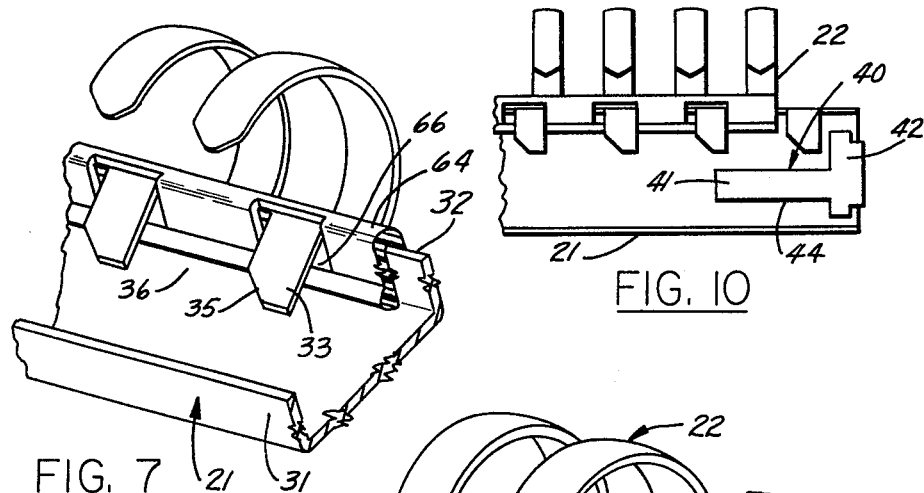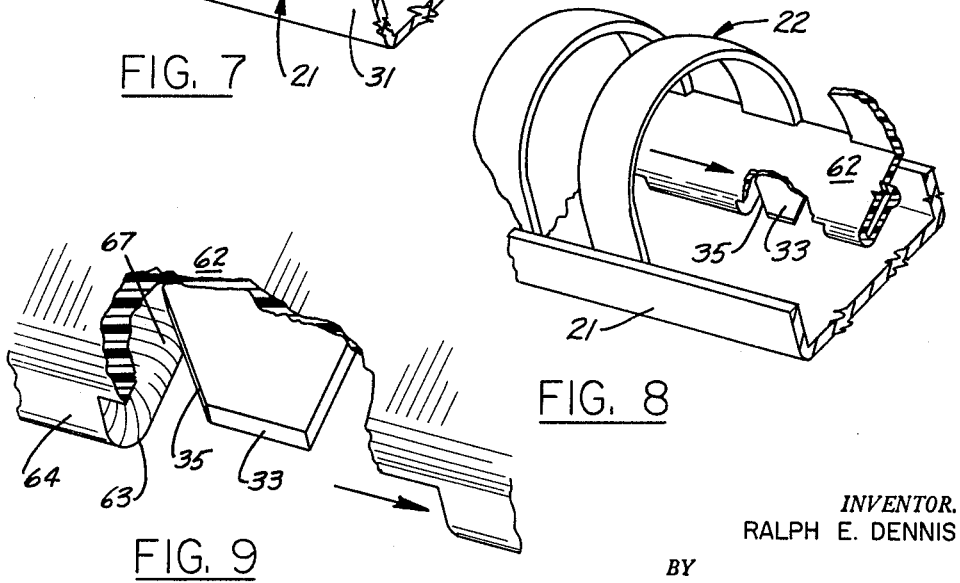

Dec. 22, 1964  R. E. DENNIS  3,162,198
BINDER UNIT

Filed Aug. 17, 1961  3 Sheets-Sheet 3

INVENTOR.
RALPH E. DENNIS
BY
MAHONEY, MILLER & RAMBO
BY
ATTORNEYS

United States Patent Office 3,162,198
Patented Dec. 22, 1964

3,162,198
BINDER UNIT
Ralph E. Dennis, Columbus, Ohio, assignor to Bindematic Corporation, Columbus, Ohio, a corporation of Ohio
Filed Aug. 17, 1961, Ser. No. 132,152
9 Claims. (Cl. 129—24)

My invention relates to a binder unit. It has to do, more particularly, with a binder unit of the general type disclosed in my copending application Ser. No. 776,958, filed November 28, 1958, and issued as Patent No. 3,003,503 on October 10, 1961. The present application is a continuation-in-part of said copending application.

As in the copending application, the present invention deals generally with a binder unit formed of two main sections, namely, a backbone section and a loose-leaf engaging ring or finger section. The ring section includes one or more fingers or rings having free outer or tip ends and root or inner ends joined together at a longitudinally extending rib. The backbone section is of substantially channel form with flanges at the two edges thereof. One of the flanges is adapted to serve as a retaining flange and to cooperate with the tip ends of the rings. The other flange is provided with inwardly extending longitudinally spaced locking lugs and the rib of the ring section is adapted to be disposed beneath said lugs adjacent the flange which carries them. The ring section has similarly longitudinally spaced locking portions adjacent said rib which are adapted to cooperate with said backbone locking lugs. Thus, by relative longitudinal or axial sliding movement of the ring section and the backbone section in one direction, the locking portions on the ring section may be aligned with the spaces between the locking lugs to permit oscillation of the ring section about the axis of the rib to move the tips of the rings away from the retaining flange of the backbone section to permit insertion or removal of loose-leaves in the binder unit. By relative longitudinal sliding movement in an opposite direction when the sections have been oscillated to move the ring tips inside the backbone retaining flange, the locking portions on the ring section can be moved beneath the locking lugs on the backbone section to retain the loose-leaves in the unit since relative oscillation to an open condition will be precluded until the sections are again moved relatively in a reverse longitudinal direction.

The present invention deals more specifically with the form of the backbone section and the cooperating ring section. The backbone section is made in a simple channel form and the ring section is improved in strength especially in regard to the connection of the rings together at their root ends. A simple releasable stop latch structure is provided at one end of the backbone section for preventing relative sliding movement of the two sections relatively in one direction to unlock the unit and a simple stop rib structure is provided at the other end of the backbone section for limiting movement of the two sections relatively in the opposite direction and preventing relative lateral displacement and disconnection of the sections.

In the accompanying drawings, examples of embodiments of the present invention are illustrated and in these drawings:

FIGURE 6 is an enlarged perspective view of a portion of the ring section ilustrating the relationship of the locking portions of the ring section and the connecting rib.

FIGURE 7 is an enlarged perspective view of a portion of the ring section and cooperating backbone section showing the sections swung relatively into open position and illustrating the shape of the locking lugs on the backbone section.

FIGURE 8 is a view similar to FIGURE 7 and illustrating the cam action of the backbone section locking lubs on the ring section locking portions produced upon relative axial movement of the two sections.

FIGURE 9 is an enlarged detail further illustrating the cam action of the lugs and locking portions as they move into locking relationship.

FIGURE 10 is a detail in plan of the end of the backbone section which carries the stop rib.

The general structure of the binder unit of the present invention has been discussed above and the detailed structure thereof will now be apparent by reference to the attached drawings which now will be described in detail.

Figure 1:
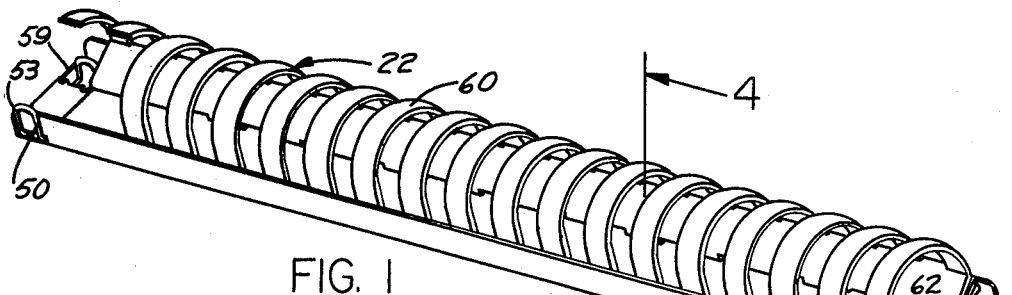
FIGURE 1 is a perspective view, partly broken away, of a binder unit embodying this invention, showing the backbone section and the loose-leaf engaging ring section in closed or loose-leaf retaining relationship.

As illustrated in FIGURE 1, the binder comprises two sections, namely a backbone section 21 and a loose-leaf engaging ring or finger section 22. These sections are joined together for relatively longitudinal or axial sliding movement and in a certain longitudinal position are free to oscillate relatively between opened and closed positions while in another longitudinal position they are prevented from oscillation relatively so that the unit will remain closed. The sections 21 and 22 may be of various materials but in the particular example shown, it is preferred that the backbone section 21 be of metal and the ring section 22 be of plastic. The two sections 21 and 22 are almost coextensive in length but the ring section 22 is slightly shorter than the backbone section 21 for reasons which will be apparent hereinafter.

The backbone section 21 is forced as an integral piece and is of substantially channel cross section throughout its length. It, therefore, includes a flat back or web 30 having the two inwardly extending flanges, one of which is at each edge thereof. The first flange 31 will be termed a ring-retaining flange and the second flange 32 will be termed a stop-carrying flange. The flanges 31 and 32 are preferably at right angles to the flat back 30.

The flanges 31 and 32 are coextensive with the back 30.

Figure 11:
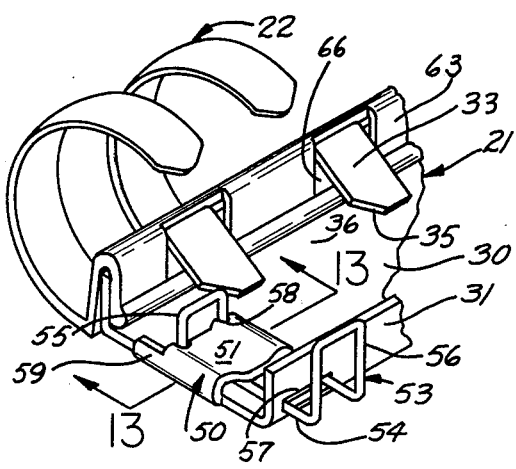
FIGURE 11 is an enlarged detail in perspective of portions of the two sections at the end where the adjustable stop latch is provided to control relative axial movement of the two sections to permit relative oscillation thereof between opened and closed relationship, the stop latch being in releasing position and the sections being swung into open relationship.
Figure 13:
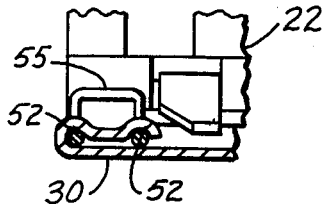
FIGURE 13 is an enlarged sectional view taken along line 13—13 of FIGURE 11.
Figure 12:
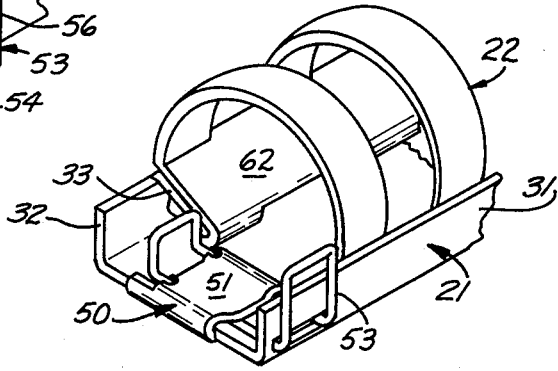
FIGURE 12 is a view similar to FIGURE 11 but showing the sections swung into closed relationship and the stop latch in stopping position.

Extending inwardly and angularly from the upper edge of the flange 32 are the ring-section locking lugs 33. These locking lugs are integral with the flange 32 and are angled toward the flat back 30. It will be noted in FIGURE 5 that the angled lugs 33 terminate short of the back 30 to provide the gaps 34. It will be noted (FIGURES 7 to 9) that one inner corner of each locking lug 33 is angled or beveled to provide a cam edge 35. The lugs 33 are disposed at longitudinally spaced intervals so as to provide spaces therebetween of suitable width which may be designated 36, as indicated in FIGURES 7 and 11. It will be noted (FIGURES 2 and 11) that the outermost lug 33 at each end of the flange 32 is spaced inwardly of the end thereof.

One end of the backbone section 21 is provided with an integral inwardly extending stop rib structure 40, as shown in FIGURES 1, 2, 3, and 10. This rib structure 40 is of substantially T-form and and includes the inner longitudinally extending body 41 and the outer cross arm 42. The cross arm 42 is joined to the back 30 of the backbone section by means of flange or tab 43 (FIGURES 2 and 3) stuck inwardly from the end of the back 30. The rib body 41 and the cross 42 of the T-shaped rib 40 are spaced inwardly from the back 30 in parallel relationship thereto and substantially all the edges thereof are provided with a depending flange 44 for strength.

The opposite end of the backbone section 21 is provided with a releasable stop latch structure 50 as shown in FIGURES 1, 11, 12, and 13. This latch structure includes a latch guide 51 which is formed integrally with the back 30 by bending a tab of metal upwardly and inwardly over the back 30. The guide tab 51 is formed with inverted guide grooves 52 in its lower surface which are parallel with each other and extend transversely above the back 30. The guide tab 51 receives the stop latch 53 which is preferably formed of metal wire having the parallel guide arms 54 which cooperate and reciprocate in the guide grooves 52. The latch 53 has at its inner end the upstanding stop portion 55 and on its outer end the upstanding handle or finger-engaging portion 56. It will be noted from FIGURE 11 that the portions 54 extend through a slot 57 in the channel flange 31. These portions are so spaced that they frictionally engage the inner sides of the grooves 52 (FIGURE 13) so as to provide means for holding the latch 53 in any position to which it is moved. Notches 58 may be provided at one edge of the guide 51 for receiving the vertical legs of the stop portion 55. The tab 51 also has a stop shoulder 59 formed thereon at the end of the channel back 30.

Thus, it will be apparent that the backbone section 21 is formed in one piece, including the rib structure 40 and the latch guide 51, the wire latch loop 54 being the only separate piece. This makes it simple to manufacture the backbone section of metal.

The loose-leaf engaging ring or finger section 22 can be formed of plastic as an injection molded integral member. It includes loose-leaf engaging ring means of ring-like cross section which may be a single member although it is preferred that the means be in the form of a plurality of separate longitudinal spaced fingers 60 as illustrated. The ring-like fingers 60 have the outer free ends or tips 61 and at their root ends are connected to a longitudinally extending connecting web 62 which serves to provide a strong rigid connection for connecting all of the fingers together. It will be noted from FIGURES 4 and 5 that the fingers or rings 60 extend through an angle greater than 180°. It will further be noted that the web 62 is flat and is of substantial width and extends the full length of the section 22. It will also be noted that the web 62 extends at an abrupt angle almost radially inwardly of the connected ring-like fingers 60.

The ring or finger section 22 also includes the longitudinally extending pivoting rib 65 which is disposed in spaced parallel relationship to the web 62, substantially midway of the edges of the web 62 and which is longitudinally coextensive with the web. The rib 65 is joined to the inner edge of the web 62 by means of a plurality of stop portions 63. Each of the stop portions 63 comprises a flat main section (FIGURES 4 to 7) at a slight angle relative to the web 62 but spaced therefrom and a portion 64 connecting to the web 62 at an abrupt angle relative to the main stop section. It will be noted from FIGURE 6 that the rib 65 is located on the outer surfaces of the stop portions 63 so that the stop portions are projections on the inner surface of the rib 65. The stop portions 63 are spaced suitably longitudinally of the ribs 65 and the web 62 so that the spaces or openings 66 are provided therebetween. It will further be noted, especially from FIGURE 9, that at least one of the edges of each stop portion 63 is curved or angled to provide a cam shoulder 67. All of the parts of the ring or finger section 22 mentioned are joined together as an integral unit.

The ring section 22 is preferably mounted on the backbone section 21 before the locking lugs 33 are bent inwardly and downwardly into their final position relative to the back 30. Also at this time, the rib structure 40 will be extending outwardly from the end of the channel. After the ring section is properly positioned on the locking lugs 33 with the lugs extending through the openings 66 thereof, the lugs are bent to their final position so that the gaps 34 at the ends thereof are of lesser extent than the thickness of the rib 65, as previously indicated, and also the rib structure 40 is bent inwardly at the flange 43 into its final position shown in FIGURE 10. During the mounting of the ring section 22 on the backbone section 21, the guide tab 51 will also be in outwardly extended position from the end of the channel base 30 and will be bent inwardly to the final position shown in FIGURES 11 and 12 after the ring section is mounted.

Figure 2:
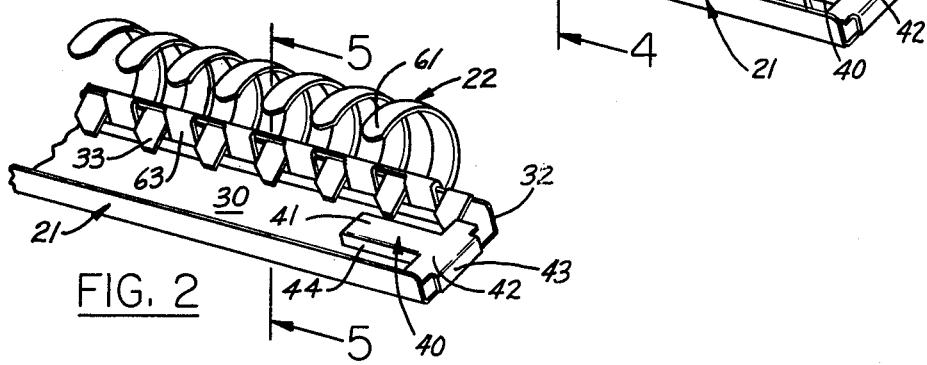
FIGURE 2 is a similar view of a portion of the binder unit but with the two sections thereof in relatively opened relationship so that the ring section can receive loose-leaves and showing the fixed stop rib provided at one end of the backbone section for limiting axial movement of the two sections in one direction and to prevent relative lateral disconnection.
Figure 4:
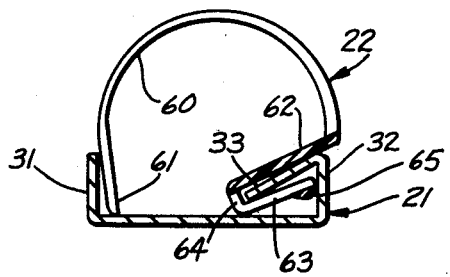
FIGURE 4 is an enlarged transverse section taken along line 4—4 of FIGURE 1.
Figure 5:
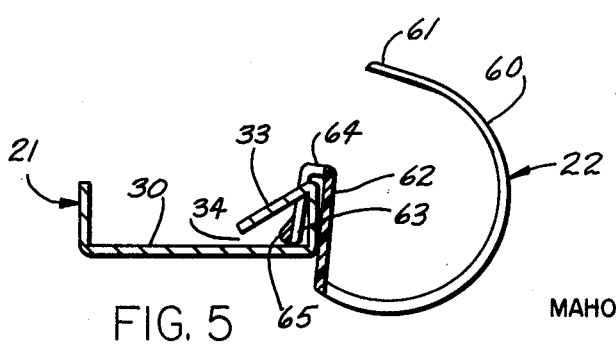
FIGURE 5 is an enlarged transverse section taken along line 5—5 of FIGURE 2.

As long as the stop lugs 33 are in or aligned with the openings 66 the ring section 22 and the backbone section 21 can be oscillated relatively to move the fingers 60 between the opened position shown in FIGURES 2 and 5 and the closed position shown in FIGURES 1 and 4. When in the opened position, as shown in FIGURE 2, loose-leaf sheets may be easily passed over the free ends 61 of the fingers or rings 60. These ends or tips 61 are free of any projections or notches and will not interfere with the mounting of the sheets thereon. As the ring section swings to open position, the flat web 62 engages the upper edge of the flange 32 and simultaneously the rib 65 is squeezed between the lower surfaces of the locking lugs 33 and the inner surface of the flange which creates friction and spreads the locking portions 63 relative to the web 62 until the web 62 passes over and around the flange sufficiently, at which time, the ring section will snap into final open position as shown in FIGURE 5. Reverse movement of the ring section 21 from the opened position shown in FIGURE 5 toward the closed position shown in FIGURE 4 will be resisted and will require slight spreading of the web 62 and locking portions 64. On this movement to closed position, the same friction and spreading action occurs and when the web 62 moves sufficiently inwardly over the flange 32 the ring section will snap into closed position shown in FIGURE 4. Also there will be a resistance to opening of the ring section at this time. After the ring section 22 reaches closed position with the finger tips 61 within the retaining flange 31, as shown in FIGURE 4, the locking lugs 33 are positioned between the planes of the web 62 and the locking portions 63 with the lugs 33 aligned with the openings or spaces 66, at this time it is still impossible to push the rib 65 laterally inwardly through the gaps 34 beyond the tips of the lugs 33 so as to disconnect the section 22 from the section 21. This is because of the provision of the rib structure 40 since the inwardly extending rib 41 will engage the connecting portions 64 at the inner edge of the web 62 and such edge to prevent this lateral displacement and disconnection.

Figure 3:
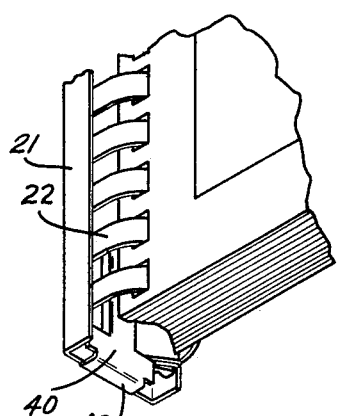
FIGURE 3 is a perspective view of a portion of the binder unit showing portions of the two sections thereof in relatively closed or loose-leaf retaining position with the loose-leaves retained thereby.

After the sheets are inserted and the sections are swung into the closed relationship shown in FIGURES 3 and 4, assuming that the latch 53 is in the releasing position shown in FIGURE 11, the end of the rib 65, associated web 62 and the end locking portion 63 will be in engagement with the stop shoulder 59 on the tab 51. This will prevent movement of the ring section 22 beyond the adjacent end of the backbone section 21. To lock the sections in this relative closed position, it is merely necessary to slide the two sections relatively so as to move the section 22 to cause the opposite end of the rib 65 and associated web 62 and the end locking portion 63 to engage the cross 42 of the T, as shown in FIGURE 1. At this time, the locking lugs 33 on the backbone section will have moved out of alignment with the openings or spaces 66 in the ring section and the locking portions 63 will lie beneath the locking lugs 33, so as to prevent further oscillation of the two sections relatively. It will be noted from FIGURE 4 that the locking lug portions 63 and the cooperating locking lugs 33 are disposed at substantially the same angle when the ring section is oscillated to closed position. As shown best in FIGURES 8 and 9, there is a camming action of the locking lugs 33 on the locking portions 63 as the ring section 22 is moved in the backbone section 21 to locked position. The beveled cam edge 35 on each lug 33 will engage the connecting portion 64 and the cam shoulder 67 to provide the cam action. This will cause lugs 33 to ride up on the flat main sections of the stop portions 63. Lateral displacement under force of the rib 65 beneath the locking lugs 33 at this time is impossible due to the thickness of the top portions 63 which are beneath the lugs 33. Furthermore, at this time the opposite end of the web 62 and associated rib 65 and end locking portion 63 will have moved to the position shown in FIGURE 12 so that the latch 53 can be pushed inwardly to engage such end and prevent return longitudinal sliding movement.

Thus, the binder section will now be effectively locked in closed relationship, as shown in FIGURE 1. Longitudinal movement in one direction at this time is precluded by the releasable latch 53 and in the other direction is precluded by the cross 42 of the rib structure 40. To open the binder it is merely necessary to pull the latch 53 outwardly and slide the ring section 22 longitudinally until its one end contacts the stop shoulder 59. At this time, the locking lugs 33 of the backbone section are aligned with the openings 66 of the ring section and oscillation of the ring section to open position will be permitted.

Figure 14:
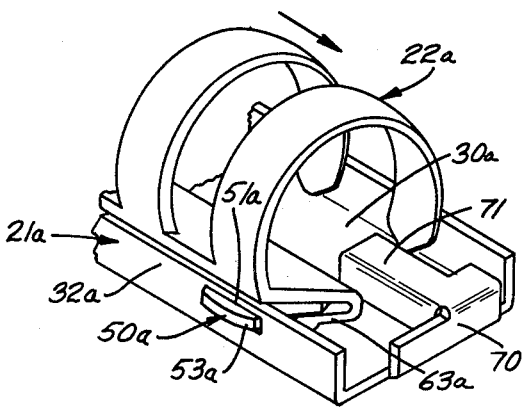
FIGURE 14 is a detail in perspective illustrating a releasable stop latch structure for use instead of the stop latch structure of FIGURES 11 and 12.
Figure 15:
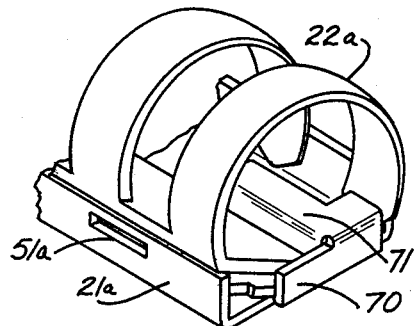
FIGURE 15 is a view similar to FIGURE 14 but showing the stop latch thereof released.

In FIGURES 14 and 15, I have illustrated a latching arrangement 50a which can be substituted for the latching arrangement 50 previously described. This latching arrangement will comprise a stop lug 53a formed on the end stop portion 63a of the ring section 22a. This lug 53a will cooperate with a slot 51a formed in the upstanding flange 32a of the backbone section 21a. When the lug 53a snaps into the slot 51a (FIGURE 14) the sections 21a and 22a are locked in closed position and at this time the locking portions 63a are beneath the locking lugs of the backbone section. The rib structure 40 previously described will still be at the other end of the unit and will function in the same manner to stop movement in that direction. To release the sections 21a and 22a to permit relative oscillation, the lug 53a is pushed inwardly and the finger section 22a is moved in the direction indicated by the arrow in FIGURE 14 to the position shown in FIGURE 15. The edge of the lug 53a is curved to facilitate release. Movement in this direction is stopped by means of a stop shoulder 70 which is carried by a stop rib structure similar to the T-shaped rib structure 40 previously described. This shoulder 70 is on an extension of the channel back 30a. The rib structure also includes a longitudinally extending rib 71 which extends inwardly over the back 30a in spaced relationship thereto. This rib 71 is spaced parallel to the back 30a and is spaced parallel to the flange 32a sufficiently to permit the necessary inward releasing movement of the lug 53a. This rib 71 will also aid in preventing lateral displacement of the rib 65a at this end in the same manner that the rib 41 functions. The rib 41 at the other end will function in the manner previously described to prevent lateral displacement at that end.

It will be apparent from the above description that this invention provides a binder unit which is generally similar to that described in my copending application but which includes many additional and improved features. Most of these features have been discussed but others will be apparent.

Having thus described this invention, what is claimed is:

1. A binder unit formed of two main sections oscillatably and slidably connected together for movement between opened and closed positions comprising a backbone section and a loose-leaf engaging ring section having a root portion and a free tip end, said ring section including a longitudinally extending pivot rib at the root portion thereof and a longitudinally extending web spaced outwardly from the rib in substantially parallel relationship thereto, locking lug portions extending transversely from said rib connected to said web and being disposed in a plane spaced inwardly of the plane of the web, said locking lug portions being spaced longitudinally of said rib and said web so as to provide longitudinally spaced openings therebetween, said backbone section being of substantially channel form with a back having two inwardly extending flanges, one of which is at each edge thereof, said pivot rib being disposed adjacent the first of said flanges and the ring section being oscillatable about the axis of the rib to bring the free tip end of the ring section into and out of cooperation with the second of said flanges of the backbone section, said second flange serving as a retaining flange with the tip end of the ring section laterally inwardly thereof when it is moved into cooperation therewith, said first flange being provided with locking lugs which extend inwardly and overlie said rib, said locking lugs being spaced longitudinally of said first flange and being spaced substantially the same as the openings between said locking portions of the ring section and being of less width than the openings so that they can extend therethrough in order to permit oscillation of the ring section about the axis of the rib, sliding movement of the ring section relative to the backbone section moving said locking lug portions beneath said locking lugs to prevent said oscillation and to retain said ring section tip end in cooperation with said second flange of said backbone section.

2. A binder unit according to claim 1 in which the ring section extends outwardly from one edge of said web and the locking lug portions extend inwardly from the other edge of said web and are joined thereto at sharp bends to space the lug portions inwardly of the web, said openings also being between said sharp bends, said locking lugs extending inwardly at an angle relative to the first flange which carries them and terminating above the back of the backbone section to form gaps therebetween, said locking lug portions being disposed at substantially the same angle as the locking lugs when the ring section is oscillated to closed position.

3. A binder unit according to claim 2 in which one corner of each lugs is angled to provide a cam edge for engaging the edge of the adjacent locking portion when the sliding movement of the two sections occurs, said engaged edge of the locking portion also being a cooperating cam edge, said pivot rib projecting from the inner surfaces of the locking lug portions and being of a cross-sectional thickness greater than the gaps at the inner ends of said locking lugs.

4. A binder unit according to claim 1 including a releasable latch structure disposed on said backbone structure at one end thereof, comprising a guide extending transversely between said flanges and a movable latch mounted for reciprocation in said guide, said latch having a stop portion adjacent the stop-carrying flange of the backbone section for movement into position to engage the adjacent end of the ring section to prevent sliding of said section toward that end of the backbone section to move the locking lug portions from beneath the locking lugs, said end of the backbone section also having a stop shoulder outwardly of said latch to engage the adjacent end of said ring section to limit sliding movement out of the end of said backbone section.

5. A binder unit according to claim 4 including a stop rib structure at the other end of the backbone section and having a longitudinally extending rib in spaced relationship to said flanges for preventing lateral movement of the pivot rib of the ring section from beneath said locking lugs through said gaps, said rib structure also including a stop shoulder for engaging the adjacent end of said ring section to prevent its sliding out of said end of the backbone section.

6. A binder unit according to claim 1 including a stop rib structure disposed in said backbone section at one end thereof between said flanges and extending longitudinally in spaced relationship thereto for preventing lateral movement of the pivot rib of the ring section from beneath said locking lugs out through said gaps.

7. A binder unit according to claim 6 including a locking lug carried on said ring section and extending into a slot formed in said second flange, said longitudinal stop rib being spaced from said first flange sufficiently to permit lateral movement of the ring section to release said locking lug.

8. A binder unit according to claim 7 including a stop shoulder at the said end of said backbone section for preventing sliding movement of the ring section outwardly of said backbone section.

9. A binder unit formed of two main sections oscillatably and slidably connected together for movement between opened and closed positions comprising a backbone section and a loose-leaf engaging ring section having a root portion and a free tip end, said ring section including a longitudinally extending pivot rib at the root portion thereof, locking lug portions extending transversely from said rib and connected thereto, said locking lug portions being spaced longitudinally of said rib so as to provide longitudinally spaced openings therebetween, said backbone section being of substantially channel form with a back having two inwardly extending flanges, one of which is at each edge thereof, said pivot rib being disposed adjacent the first of said flanges and the ring section being oscillatable about the axis of the rib to bring the free tip end of the ring section into and out of cooperation with the second of said flanges of the backbone section, said second flange serving as a retaining flange with the tip end of the ring section laterally inwardly thereof when it is moved into cooperation therewith, said first flange being provided with locking lugs which extend inwardly and overlie said rib, said lugs being spaced longitudinally of said first flange and being spaced substantially the same as the openings between said locking portions of the ring section and being of less width than the openings so that they can extend therethrough in order to permit oscillation of the ring section about the axis of the rib, sliding movement of the ring section relative to the backbone section moving said locking lug portions beneath said locking lugs to prevent said oscillation and to retain said ring section tip end in cooperation with said second flange of said backbone section, said locking lugs extending inwardly at an angle relative to the first flange which carries them and terminating above the back of the backbone section to form gaps therebetween, said locking lug portions being disposed at substantially the same angle as the locking lugs when the ring section is oscillated to closed position, a stop rib structure disposed in said backbone section at one end thereof between said flanges and extending longitudinally in spaced relationship thereto for preventing lateral movement of the pivot rib of the ring section from beneath said locking lugs out through said gaps, and a releasable latch structure disposed on said backbone structure at the other end thereof, said releasable latch structure comprising a guide extending transversely between said flanges and a movable latch mounted for reciprocation in said guide, said latch having a stop portion adjacent the stop-carrying flange of the backbone section for movement into position to engage the adjacent end of the ring section to prevent sliding of said section toward that end of the backbone section to move the locking lug portions from beneath the locking lugs, said end of the backbone section also having a stop shoulder outwardly of said latch to engage the adjacent end of said ring section to limit sliding movement out of the end of said backbone section.

References Cited in the file of this patent
UNITED STATES PATENTS

| | | |
|---|---|---|
| 2,264,142 | Penny et al. | Nov. 25, 1941 |
| 3,003,503 | Dennis | Oct. 10, 1961 |